(12) United States Patent
Patel et al.

(10) Patent No.: US 10,719,622 B2
(45) Date of Patent: *Jul. 21, 2020

(54) CYBER SECURITY SYSTEM AND METHOD FOR TRANSFERRING DATA BETWEEN SERVERS WITHOUT A CONTINUOUS CONNECTION

(71) Applicants: Kalpesh S. Patel, Schaumburg, IL (US); Shilpi D. Bhargava, Schaumburg, IL (US)

(72) Inventors: Kalpesh S. Patel, Schaumburg, IL (US); Shilpi D. Bhargava, Schaumburg, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/391,623

(22) Filed: Apr. 23, 2019

(65) Prior Publication Data

US 2019/0251282 A1 Aug. 15, 2019

Related U.S. Application Data

(63) Continuation of application No. 15/453,885, filed on Mar. 8, 2017, now Pat. No. 10,311,245.

(60) Provisional application No. 62/457,615, filed on Feb. 10, 2017, provisional application No. 62/305,116, filed on Mar. 8, 2016.

(51) Int. Cl.
*G06F 21/62* (2013.01)
*H04L 29/06* (2006.01)
*H04L 29/08* (2006.01)
*G06F 3/06* (2006.01)

(52) U.S. Cl.
CPC .......... *G06F 21/6218* (2013.01); *G06F 3/067* (2013.01); *G06F 3/0622* (2013.01); *G06F 3/0659* (2013.01); *H04L 63/0884* (2013.01); *H04L 67/2842* (2013.01); *G06F 2221/2143* (2013.01)

(58) Field of Classification Search
CPC .... G06F 3/0622; G06F 3/067; G06F 21/6218; G06F 3/0659; G06F 2221/2143; H04L 67/2842; H04L 63/0884
See application file for complete search history.

(56) References Cited

U.S. PATENT DOCUMENTS 8,402,112 B2 * 3/2013 Di Marco ........... H04L 67/2885
709/203
8,543,697 B2 * 9/2013 Knowles ................ H04L 67/14
709/225
9,064,124 B1 * 6/2015 Davis .................... G06F 21/606
(Continued)

*Primary Examiner* — Ali S Abyaneh
*Assistant Examiner* — Shu Chun Gao
(74) *Attorney, Agent, or Firm* — Richards Patent Law P.C.

(57) ABSTRACT

A cybersecurity system includes a controller that functions as a gateway between an end user device and an offline data storage device. When the end user device wants to access a file on the offline data storage device the controller severs a connection between a temporary storage memory and the end user device, establishes a connection with the offline data storage device, pulls the data from the offline data storage device to a temporary storage memory, then severs the connection with the offline data storage device, then establishes the connection with the end user device and communicates the data from the temporary storage memory to the end user device before overwriting the data in the temporary storage memory.

20 Claims, 3 Drawing Sheets

(56) References Cited

U.S. PATENT DOCUMENTS

| | | | |
|---|---|---|---|
| 9,559,889 B1* | 1/2017 | Vincent | H04L 29/08522 |
| 9,632,936 B1* | 4/2017 | Zuckerman | G06F 12/0855 |
| 9,678,922 B2* | 6/2017 | Osuga | G06F 3/067 |
| 2015/0245264 A1* | 8/2015 | Xiong | H04L 67/2842 |
| | | | 370/331 |
| 2017/0093736 A1* | 3/2017 | Tsirkin | H04L 47/36 |

* cited by examiner

CYBER SECURITY SYSTEM AND METHOD FOR TRANSFERRING DATA BETWEEN SERVERS WITHOUT A CONTINUOUS CONNECTION

CROSS-REFERENCE TO RELATED APPLICATIONS

This application is a continuation application of U.S. application Ser. No. 15/453,885 filed on Mar. 8, 2017, now U.S. patent Ser. No. 10/311,245 B2 published on Jun. 4, 2019. This application incorporates by reference and claims the benefit of priority to U.S. Provisional Application No. 62/457,615 filed Feb. 10, 2017, and U.S. Provisional Application No. 62/305,116 filed Mar. 8, 2016.

BACKGROUND OF THE INVENTION

The present invention relates to cyber security system. More specifically, the present invention relates to the utilization of hardware circuitry to create a cyber security system and method for transferring data between servers without a continuous connection.

Cyber security has become a huge issue in modern society. Virtually every piece of sensitive information belonging to individuals, companies, and the government is stored in computerized form. Recent massive leaks of such sensitive information have led to calls for improved cyber security from many powerful business leaders and the President of the United States. Many issues and limitations exist with current cyber security technologies. Likely the biggest of these limitations is that these technologies are almost all software based. Most cyber security attacks come in the form of software based attack, meaning the software of cybercriminals is pitted against the cyber security software of their target. While low-level criminals may not have the technology needed to defeat these cyber security software solutions, as highly sophisticated criminal enterprises, terrorist groups, and even rival governments utilize cyber-attacks, the ability to fend off such attacks becomes impossible for most parties utilizing software based security solutions alone.

Another issue software based cyber security systems fail to address is that most (if not all) data is now stored in massive online data stores which are accessible at all times from anywhere with an internet connection. While this is beneficial for the sake of convenience, it is also extremely detrimental because the data is always in a place where it can be attacked by cybercriminals. Additionally, once one of these large data stores in broken into, huge amounts of data can be stolen extremely quickly.

Accordingly, there is a need for a cyber security system and method for transferring data between servers without a continuous connection.

BRIEF SUMMARY OF THE INVENTION

To meet the needs described above and others, the present disclosure provides a cyber security system and method for transferring data between servers without a continuous connection.

In one embodiment of the subject matter provided herein, the cyber security system utilizes a hardware gateway which separates online data and offline data, physically preventing access to secure data when not in use. This hardware gateway, dubbed a "HyperWall", may work with any number of other hardware components such as microcontrollers, integrated chips, diodes, lasers etc., as well as software which manages the flow of secure data when it is needed online and when it can be moved back to offline storage.

The hardware of this embodiment may act like a physical gateway that prevents a direct connection between an offline data storage device and an online end user device. As described further herein, when the end user device needs to access data stored in the offline data storage device, a controller severs a connection between a temporary storage memory and the end user device, establishes a connection with the offline data storage device, pulls the data from the offline data storage device to a temporary storage memory, then severs the connection with the offline data storage device, then establishes the connection with the end user device and communicates the data from the temporary storage memory to the end user device before overwriting the data in the temporary storage memory. An intermediate database may be used between the temporary storage memory and end user device to prevent direct connection between the two.

At no time is the connection to the data storage device physically active at the same time as the connection to the online computing system. As a result, there is only a unidirectional data flow from the data storage device to the online computing system at that moment. After each request for data to be transferred from the data storage device to the online computing system is completed, the online and offline server memory used to fulfill the request are over-written, but not the physical offline data storage device in which the secure information is permanently stored.

In one example, a cybersecurity system includes: an end user device; a data storage device storing a plurality of data files; an authentication device in communication with the end user device; a controller in communication with the authentication device and the data storage device; and a temporary storage memory device in communication with the controller and further including a first communication pathway to the data storage device and a second communication pathway to the end user device; wherein, in response to a request from the end user device to access one of the plurality of data files stored on the data storage device, the controller: first receives user verification from the authentication device; then receives a request for the one of the plurality of data files stored on the data storage device; then disables the first communication pathway between the end user device and the temporary storage memory device; then activates the second communication pathway between the data storage device and the temporary storage memory device; then requests the one of the plurality of data files stored on the data storage device from the data storage device to be written to the temporary storage memory device; then disables the second communication pathway between the data storage device and the temporary storage memory device; then activates the first communication pathway between the end user device and the temporary storage memory device; then allows the end user device to access the one of the plurality of data files stored on the data storage device from the temporary storage memory device; then disables the first communication pathway between the end user device and the temporary storage memory device; and then erases the one of the plurality of data files stored on the data storage device from the temporary storage memory device.

In some examples, the end user device is a desktop computer. In others, the end user device is a mobile computing device. In some examples, the authentication device is an enterprise server. In further examples, the temporary storage memory device is a server. In some embodiments, the data storage device is an enterprise server. In some examples, the authentication device, temporary storage memory device, and data storage device are contained within a single piece of physical hardware. In some embodiments, the authentication device communicates with the controller via an optical communication controller and the data storage device communicates with the controller via optical communication controllers. In some examples, the optical communication controller utilizes at least one light emitting diode for optical communication.

In another example, a cybersecurity method includes the steps of: in response to receiving an authenticated request from an end user device to access one of a plurality of data files stored on a data storage device, a controller: first disables the first communication pathway between the end user device and the temporary storage memory device; then activates the second communication pathway between the data storage device and the temporary storage memory device; then requests the one of the plurality of data files stored on the data storage device from the data storage device to be written to the temporary storage memory device; then disables the second communication pathway between the data storage device and the temporary storage memory device; then activates the first communication pathway between the end user device and the temporary storage memory device; then allows the end user device to access the one of the plurality of data files stored on the data storage device from the temporary storage memory device; then disables the first communication pathway between the end user device and the temporary storage memory device; and then erases the one of the plurality of data files stored on the data storage device from the temporary storage memory device.

The goal of the present invention is to prevent large scale, direct, online access to secure data. This innovation provides a cyber security solution which mimics the way human's stored secure information before the digital age. Each secure document is stored in an offline safety deposit box of sorts, with the safe deposit box (offline memory) containing the secured information only being accessible to a user with the key (proper authentication).

An advantage of the present invention is, like the safe deposit boxes of old, only one secure piece of information may be accessed at a time. Extending this analogy outwards, current online data stores are similar to a large single room vault. Once the vault is cracked, all contents of the vault are accessible. The present invention acts, as mentioned above, like a series of safe deposit boxes requiring a cybercriminal to break open many boxes to access a wealth of secure information. This reduction in the speed of access to secure information may help to limit the scope of data breaches and also give authorities a better chance to detect, foil, and apprehend online criminals.

Another advantage of the present invention is that, not only is data segregated and more difficult to steal in large chunks, it is also stored offline, which assists in preventing most attacks. The only way a user can have their information stolen over the internet is for that information to be on the internet to steal in the first place. The present invention physically prevents cyber criminals from having access to sensitive data by placing the bulk of the data in a location which is not continuously accessible by online users.

Still yet another is the creation of a one-way (unidirectional) flow of data at a given moment. Since the system never physically connects the offline data storage device and the online computer system at the same time, the user cannot directly access any of the offline data stored by the system, further deterring cyber criminals. The physical connections of the system may also be wired to allow data to flow only in one direction from components as well to further secure the system.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE INVENTION

Figure 1:
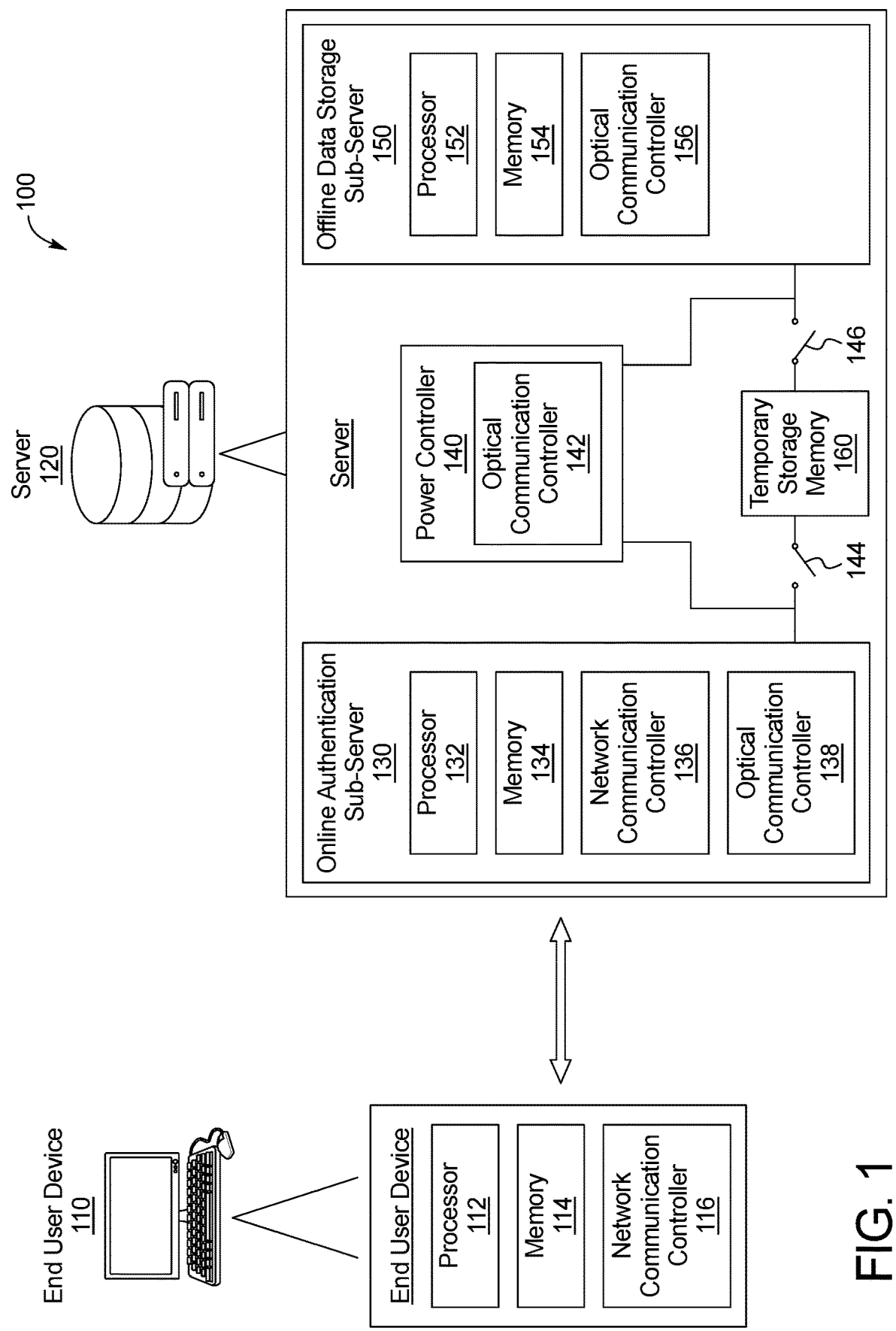
FIG. 1 is a schematic diagram of a non-continuous connection data transfer cybersecurity system.
Figure 3:
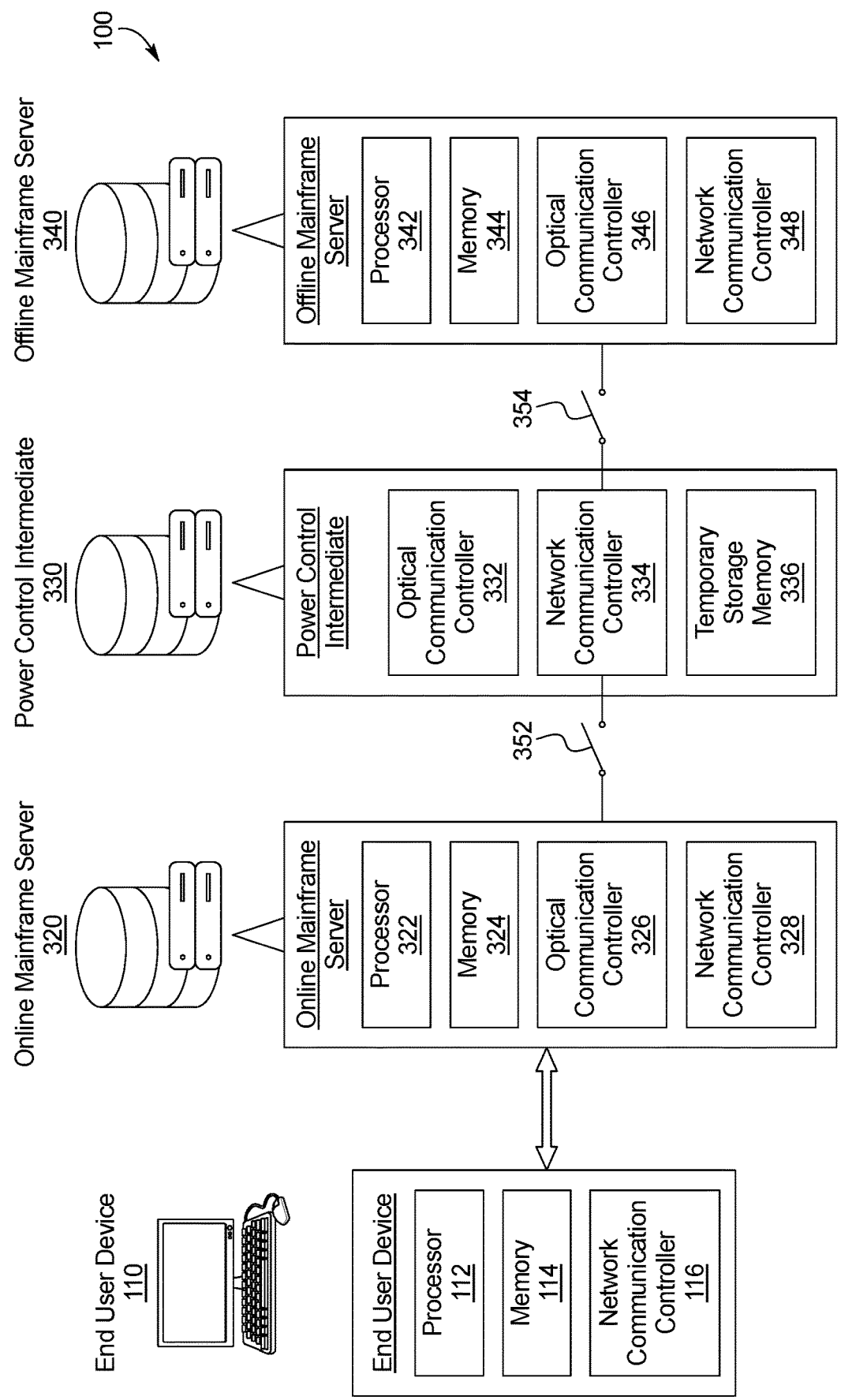
FIG. 3 is a schematic diagram of a large-scale non-continuous connection data transfer cybersecurity system.

FIG. 1 is a diagram of a non-continuous connection data transfer cybersecurity system 100. As shown in FIG. 1, the system 100 may be embodied in a single physical server 120. An example of the system 100 being embodied in multiple servers is shown in FIG. 3, as described further herein.

The server 120 shown in FIG. 1 may be connected to the internet, an internal intranet, and/or an internal network. In this example, an end user device 110 (including a processor 112, memory 114, and network communication controller 116) connects to the server 120 via the internet. Such a connection may be established via the device's 110 network communication controller 116 utilizing any communication protocol which enables transmission of data (e.g., Ethernet, Wi-Fi, ZigBee, Bluetooth, RF). Once the end user device 110 connects to the server 120, the end user device 110 is authenticated by the server 120. Such authentication is carried out, in this example, by a physically distinct online authentication sub-server 130. This online sub-server 130 acts as the external point of communication between the end user device 110 and server 120. The authentication sub-server 130 itself contains a processor 132, memory 134, network communication controller 136, and optical communication controller 138. The network communication controller 136 handles the aforementioned communications between end user device 110 and the server 120.

Once the end user device 110 is connected to the server 120 and authenticated by the authentication sub-server 130, the end user indicates data to obtain from the offline data sub-server 150 (a list of such data may be maintained in the memory of the authentication sub-server 130) the optical communication controller 138 of the authentication sub-server 130 signals the power controller 140 and/or offline data storage sub-server 150. In this example, the optical communication controller 138 may send an optical signal via an LED laser diode, etc. The signal sent by optical communication controller 138 the is received by the optical communication controllers (142 and 156) of the power controller 140 and offline data storage sub-server 150. The signal may be received by the optical communication controllers (138,142,156) via use of an electro-optical sensor, etc. The signal indicates that the power controller 140 should enable the connection between the offline data storage sub-server 150 and temporary data storage 160. The laser signal also indicates to the offline data sub-server 150 (specifically to its processor 152 and memory 154) what data to copy to the temporary data storage 160.

After the data is copied from the offline data sub-server 150 to the temporary data storage 160, the offline data sub-server 150 then sends a signal via its optical communication controller 156 (e.g., a laser diode, etc.) to the optical communication controllers (142 and 138) of the power controller 140 and authentication server 130. The signal sent by the offline data sub-server 150 triggers the power controller 150 to terminate the connection 146 (between offline sub-server 150 and temporary storage 160) and then activate the connection 144 between the online authentication sub-server 130 and temporary storage 160. Once the connection 144 between online authentication sub-server 130 and temporary storage 160 is active, the end user device 110 may then access the data stored on the temporary data storage medium 160. Once the end user device 110 terminates the secure, authenticated access to the data stored on the temporary data storage medium 160, the system 100 overwrites the temporary data storage medium 160, leaving the secured data stored permanently by the system 100 on the offline sub-server 150. The temporary memory storage 160 may also be further secured by use of different types of physical storage memory which can only hold plain text files (instead of rich text files, executables, etc.).

Figure 2:
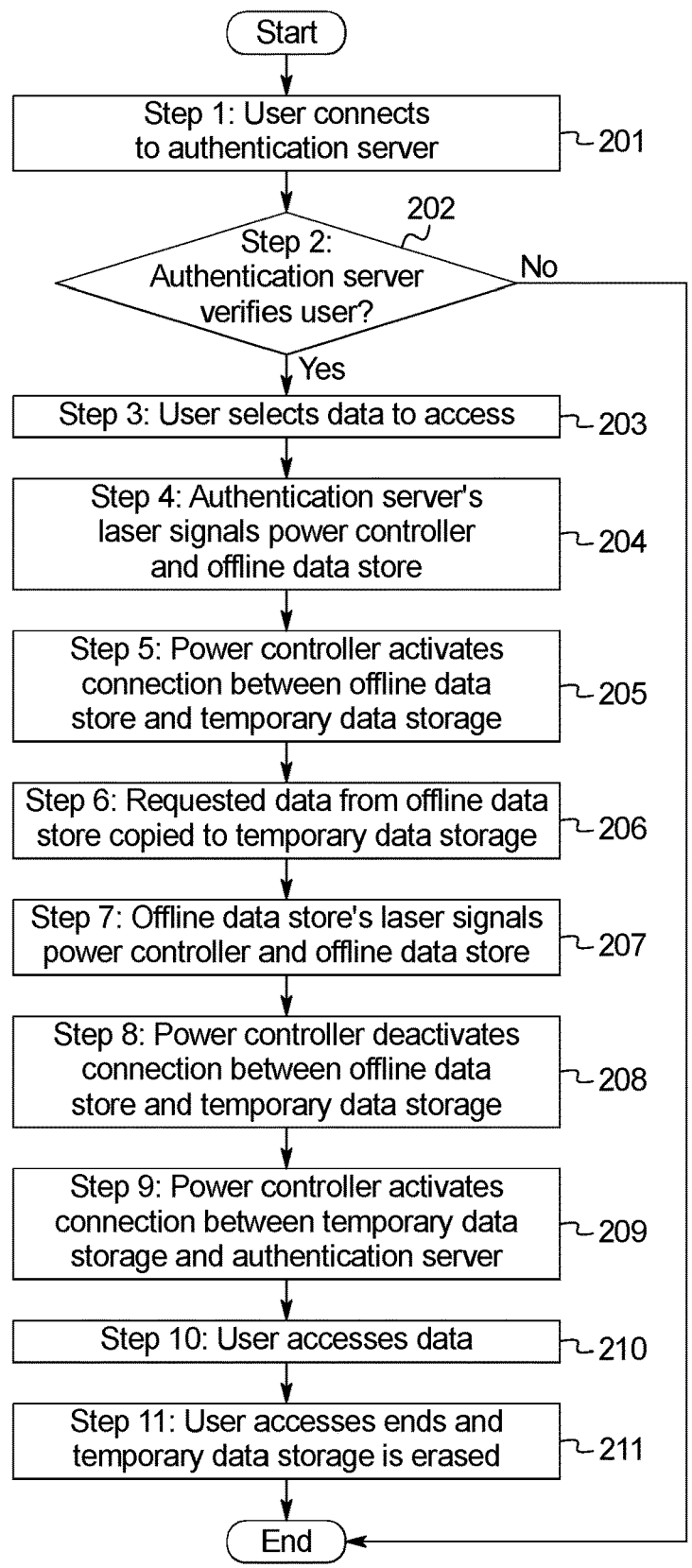
FIG. 2 is a decision tree which details the steps the system takes when a user attempts to access data securely stored by the system.

FIG. 2 is a decision tree which details the steps the system 100 takes when a user attempts to access data securely stored by the system 100. As shown in FIG. 2, at a first step 201, an end user connects to the system's 100 authentication server 120. Authentication of users may be carried out by password entry, biometric scan, or another means which ensures the end user is authorized to access the system 100 in a second step 202. Once authentication is complete, the user may then select which data the user wishes to access from the offline data sub-server 150 in a third step 203. If the user is not authenticated, the user's session ends. Additionally, the actual data is not directly accessible to the end user at step 203, rather only metadata concerning the secure data is displayed to the end user (e.g., file names, dates, etc.). Once an authenticated user indicates a wish to access a certain piece of data, the authentication server 130 signals the offline data storage sub-sever 150 and power controller 140 at a fourth step 204. Such signaling may be accomplished by use of laser diodes, but may also be carried out by another secure means of wireless communication (e.g., magnets, ZigBee, RF, Bluetooth, etc.).

Once the signal (an optical signal in this example) is received by the power controller 140 and offline data storage sub-server 150, the power controller activates a connection between the offline data storage sub-server 150 and temporary data storage 160 at a fifth step 205. In this embodiment, the connection 146 between the data storage sub-server 150 and temporary data storage 160 may be a wired connection (e.g., the connection is activated by physically switching on the connection); however, the connection may also be achieved via wireless communication controllers. For example, the data storage sub-server 150 and temporary data storage 160 may both have a dedicated wireless communication controller (RFID, Bluetooth, ZigBee, etc.) for data transmission which is switched on only when indicated to do so by the system 100. Once the connection 146 (in wired or wireless form) is established between the data storage sub-server 150 and temporary data storage 160, the data requested by the authenticated end user is copied from the data storage sub-server 150 to temporary data storage 160 at step 206.

Once the data is copied to the temporary data storage 160 from the data storage sub-server 150, the storage sub-server's 150 optical communication controller 156 signals the power controller 140 (by way of its optical communication controller 142) at step 207 to deactivate the connection 146 between the temporary data storage 160 and the offline data storage sub-server 150 (step 208). Subsequent to the deactivation of the connection between the temporary data storage 160 and the offline data storage sub-server 150, the power controller 140 then activates the connection 144 between the temporary data storage 160 and authentication server 120 (step 209).

At this point, the end user may access the data (step 210) from the temporary storage memory 160 and, once the user is finished accessing the data, the system 100 overwrites the data stored on the temporary storage memory 160 (step 211). If the end user wishes to access more data, the user may be required to re-authenticate to acquire more data from the secure system 100 preventing users from accessing the entire data store in a single session. If a user wishes to update data on the secure, offline sub-server 150, this same process would be carried out in reverse with that data to be updated being loaded onto the temporary memory 160 from the authentication server 120, the connection 144 between these components then being disabled, the connection 146 between the temporary storage memory 160 and the secure offline sub-server 150 then being enabled, and the updated data then being loaded from the temporary storage memory 160 onto the secure offline sub-server 150.

It should be noted the sequence of steps above is just one example of how the system 100 can authenticate an end user device 110. For example, a request to access a file on the offline sub-server 150 may be verified by the offline sub-server 150 itself. In this situation, the end user device's 110 request may still be received by the online server 130, but be copied to the temporary storage memory 160 prior to authentication. Once the unauthenticated request is copied to the temporary storage memory 160, the system 100 will disable the connection 144 between the temporary storage memory 160 and online server 130 before enabling 146 the connection between temporary storage memory 160 and online server 150, at which point the offline server 150 will authenticate the request by referring to a user database, etc. before completing the requested action.

FIG. 3 is a diagram of a large-scale non-continuous connection data transfer cybersecurity system 100. A shown in FIG. 3, the non-continuous connection data transfer cybersecurity system 100 may be implemented across multiple servers and network devices to support and provide security to large scale, enterprise level databases. In this embodiment, the functions carried out by the server 120 depicted in FIG. 1 have been spread out across various physically separate network devices to better manage load and bandwidth concerns. In this example, like the example shown in FIG. 1, an end user device 110 (containing a processor 112, memory, 114, and network communication controller 116) accesses secure data via an online main frame server 320. This online mainframe server 320 acts very similarly to the authentication sub-server 120 shown in FIG. 1 and authenticates end user device(s) 110 wishing to access data secured by the system 100. The online mainframe server 320 contains a processor 322, memory 324, optical communication controller 326, and network communication controller 328. The online mainframe server 320 may also host any number of other sub-servers such as a web server, user database server, etc.

Once an end user is authenticated, the online main frame server 320 will signal the power control intermediate 330 and offline mainframe server 340 via its optical communication controller 326 (e.g., a laser diode). At this point the power control intermediate 330 (which contains its own optical communication controller 332, a network communication controller 334, and temporary storage memory 336) will activate the connection between the power control intermediate 330 and offline mainframe server 340. The offline mainframe server, in this embodiment, contains a processor 342, memory 344, optical communication controller 346, and network communication controller 348. The signal transmitted via laser diode from the online main frame server 320 to the power control intermediate 330 and offline mainframe server 340 triggers data selected by an authenticated user to be transferred from the offline mainframe server 340 to the temporary storage 336 of the power control intermediate 330.

In this embodiment, since the system is implemented across multiple network devices, the data is transmitted from the offline mainframe server 340 to the temporary storage 336 via network connection 354 (e.g. Ethernet connection). Once the data is copied to the temporary storage memory 336, the optical communication controller 346 of the offline mainframe server 340 deactivates the network connection 354 between the offline mainframe server 340 and the temporary storage 336. After the connection 354 is deactivated, a connection 352 between the temporary storage 336 and online mainframe server 320 is activated, allowing an end user to access the selected data. In this example, the connection 352 is an Ethernet connection to aid in the speed of transmission between separated system 100 components, but like the embodiment shown in FIG. 1, could also be any form of wired or wireless connection capable of transmitting data. Once the end user terminates his or her access to the data stored on the temporary storage memory 336, the system 100 overwrites the data returning the system 100 to a default, totally secured state.

As mentioned above, many different means of communication may be utilized to enable communication between the physically parted components of this system. One example if the use of a visual data transmitter and receiver which would enable one component to display a picture and another component to perceive the data displayed. Another example would be to transmit all data on the system via infrared signal only. Bits of data can be encoded as a series of infrared signals and such a means of transmission could be used by the system 100 to avoid any physical connection between online and offline components. Yet another example is the use of laser imprinting, which may be received by another system component instead of the need for a wired connection.

It should be noted that various changes and modifications to the presently preferred embodiments described herein will be apparent to those skilled in the art. Such changes and modifications may be made without departing from the spirit and scope of the present invention and without diminishing its attendant advantages.

We claim:

1. A cybersecurity system comprising:
an end user device;
a data storage device storing a plurality of data files;
an authentication device in communication with the end user device;
a controller in communication with the authentication device and the data storage device; and
a temporary storage memory device in communication with the controller and further including a first communication pathway to the data storage device and a second communication pathway to the end user device;
wherein, in response to a request from the end user device to access one of the plurality of data files stored on the data storage device, the controller:
receives user verification from the authentication device;
receives a request for the one of the plurality of data files stored on the data storage device;
disables the first communication pathway between the end user device and the temporary storage memory device;
activates the second communication pathway between the data storage device and the temporary storage memory device;
requests the one of the plurality of data files stored on the data storage device from the data storage device to be written to the temporary storage memory device; and
transferring the one of the plurality of data files stored on the data storage device to the temporary storage memory device via the activated second communication pathway.

2. The cybersecurity system of claim 1, wherein the controller is further configured to disable the second communication pathway between the data storage device and the temporary storage memory device.

3. The cybersecurity system of claim 1, wherein the controller is further configured to activate the first communication pathway between the end user device and the temporary storage memory device.

4. The cybersecurity system of claim 1, wherein the controller is further configured to allow the end user device to access the one of the plurality of data files stored on the data storage device from the temporary storage memory device.

5. The cybersecurity system of claim 1, wherein the controller is further configured to disable the first communication pathway between the end user device and the temporary storage memory device.

6. The cybersecurity system of claim 1, wherein the controller is further configured to erase the one of the plurality of data files stored on the data storage device from the temporary storage memory device.

7. The cybersecurity system of claim 1, wherein the authentication device is an enterprise server.

8. The cybersecurity system of claim 1, wherein the authentication device, temporary storage memory device, and data storage device are contained within a single piece of physical hardware.

9. The cybersecurity system of claim 1, wherein the authentication device communicates with the controller via an optical communication controller.

10. The cybersecurity system of claim 1, wherein the data storage device communicates with the controller via optical communication controllers, wherein the optical communication controller utilizes at least one light emitting diode for optical communication.

11. A cybersecurity method comprising steps of:
in response to receiving an authenticated request from an end user device to access one of a plurality of data files, wherein the plurality of data files are stored on a data storage device:
receiving user verification from an authentication device; wherein the authentication device is in communication with the end user device and a controller;
receiving a request for the one of the plurality of data file stored on the data storage device;
disabling by the controller a first communication pathway between the end user device and a temporary storage memory device, wherein the temporary storage memory device is in communication with the controller, the data storage device and the end user device;
activating by the controller a second communication pathway between the data storage device and the temporary storage memory device;
requesting by the controller the one of the plurality of data files stored on the data storage device from the data storage device to be written to the temporary storage memory device; and
transferring the one of the plurality of data files stored on the data storage device to the temporary storage memory device via the activated second communication pathway.

12. The cybersecurity method of claim 11, wherein the controller is further configured to disable the second communication pathway between the data storage device and the temporary storage memory device.

13. The cybersecurity method of claim 11, wherein the controller is further configured to activate the first communication pathway between the end user device and the temporary storage memory device.

14. The cybersecurity method of claim 11, wherein the controller is further configured to allow the end user device to access the one of the plurality of data files stored on the data storage device from the temporary storage memory device.

15. The cybersecurity method of claim 11, wherein the controller is further configured to disable the first communication pathway between the end user device and the temporary storage memory device.

16. The cybersecurity method of claim 11, wherein the controller is further configured to erase the one of the plurality of data files stored on the data storage device from the temporary storage memory device.

17. The cybersecurity method of claim 11, wherein the authentication device, temporary storage memory device, and data storage device are contained within a single piece of physical hardware.

18. The cybersecurity method of claim 11, wherein the authentication device communicates with the controller via an optical communication controller.

19. The cybersecurity method of claim 18, wherein the authentication device and data storage device communicate with the controller via optical communication controllers.

20. The cybersecurity method of claim 19, wherein the optical communication controllers utilize at least one light emitting diode for optical communication.

* * * * *